Figure 1:
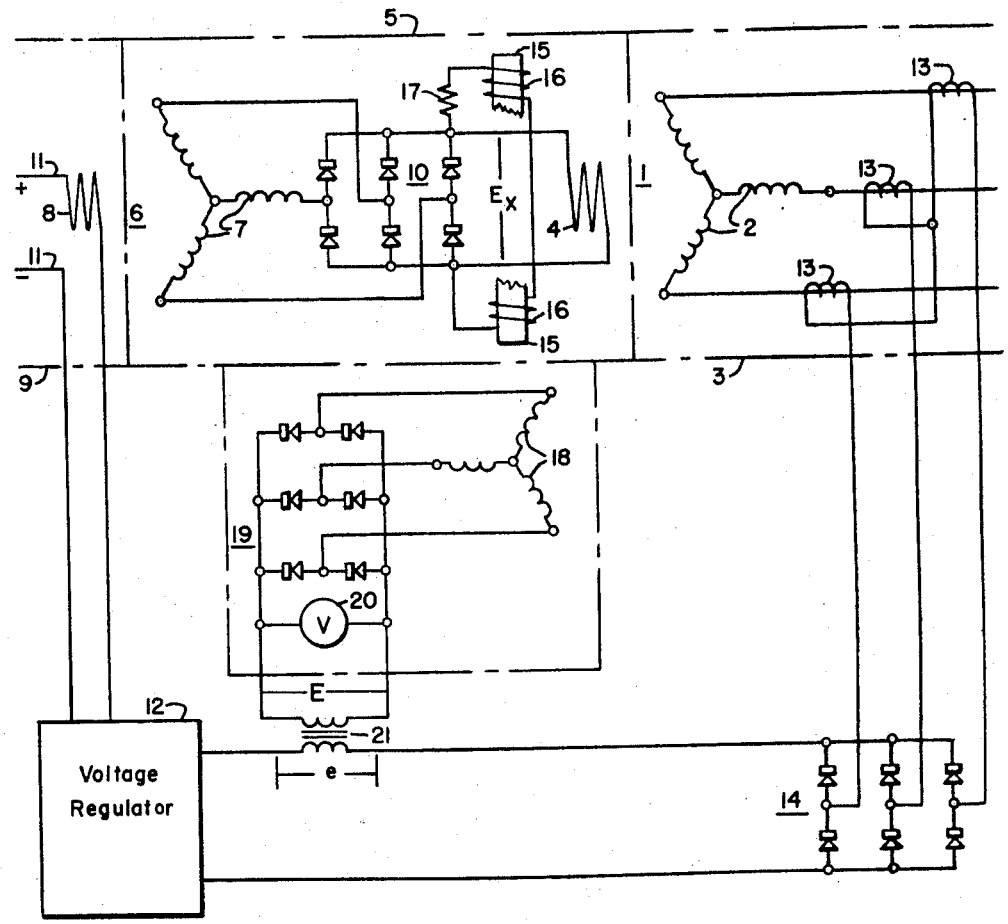

Nov. 17, 1959  T. J. BLISS  2,913,656
SENSING SYSTEM FOR BRUSHLESS TYPE GENERATOR
Filed Jan. 10, 1958  2 Sheets-Sheet 1

WITNESSES:
Bernard R. Giegner
Ernest P. Klipfel

INVENTOR
Theodore J. Bliss
BY
ATTORNEY

United States Patent Office 2,913,656
Patented Nov. 17, 1959

2,913,656

SENSING SYSTEM FOR BRUSHLESS TYPE GENERATOR

Theodore J. Bliss, Churchill Boro, Pa., assignor to Westinghouse Electric Corporation, East Pittsburgh, Pa., a corporation of Pennsylvania Application January 10, 1958, Serial No. 708,219

9 Claims. (Cl. 322—25)

The present invention relates to alternating current dynamoelectric machines of the brushless type, and more particularly to a system for sensing exciter current or voltage in an excitation system utilizing a rotating rectifier.

The successful automatic control of an exciter supplying the field of a synchronous alternating current machine requires knowledge as to the magnitude and time rate-of-change of the current or voltage from the exciter. Such information may be used to furnish a feedback signal to a regulator for stabilizing the excitation system. In conventional excitation systems where the field current passes from stationary circuits to the rotating field of the synchronous alternating current machine through slip rings, it is a simple matter to introduce a shunt in the stationary portion of the circuit and measure the voltage across the shunt which is directly proportional to the exciter output current. In addition, it is common to provide an indication of the exciter output voltage by means of a voltmeter connected across the exciter terminals. In conventional excitation systems, a measure of the time rate-of-change of the exciter terminal voltage is obtained by means of a transformer connected across the output terminals of the exciter, which is used as a damping transformer to supply a feedback signal to a voltage regulator proportional to the rate-of-change of the exciter terminal voltage. The regulator is thereby furnished with information to prevent excessive transient overshoot of the voltage and to keep the time of recovery of the voltage as short as possible, thereby stabilizing the output of the synchronous alternating current machine.

In alternating current dynamoelectric machines of the brushless type, the circuitry between the exciter and the field of the synchronous alternating current machine is not stationary and therefore, the conventional means described previously cannot be used. A brushless alternating current synchronous machine has a stationary member with an alternating current armature winding and a rotating member with a direct current field winding. Excitation for the direct current field winding is provided by an alternating current exciter which has a stationary direct current field member and a rotating alternating current armature member preferably mounted on the same shaft as the field winding of the main machine. A rotating rectifier assembly, also mounted on the same shaft, or rotating member, connects the exciter armature winding to the field winding of the synchronous alternating current machine, thereby supplying direct current excitation to the field of the main machine. In this manner direct current excitation is supplied to the field of a synchronous alternating current machine by means of conductors retained on the shaft between the rectifier assembly and the field of the main machine. Since the circuitry between the exciter and field is not stationary, information concerning the exciter terminal voltage and current and their rate-of-change must be taken from the rotating rectifier exciter to the stationary switchboard instruments and voltage regulating equipment in some new manner. The conventional method of obtaining information concerning exciter output and its time rate-of-change is entirely inapplicable with alternating current dynamoelectric machines of the brushless type.

An object of the present invention is to provide an alternating current dynamoelectric machine with a system for sensing exciter current or voltage in an excitation system utilizing a rotating rectifier.

Another object of the invention is to provide an alternating current dynamoelectric machine of the brushless type described above with a sensing system capable of measuring the time rate-of-change of the exciter terminal voltage or current being supplied to the field of the synchronous alternating current machine.

Figure 2:
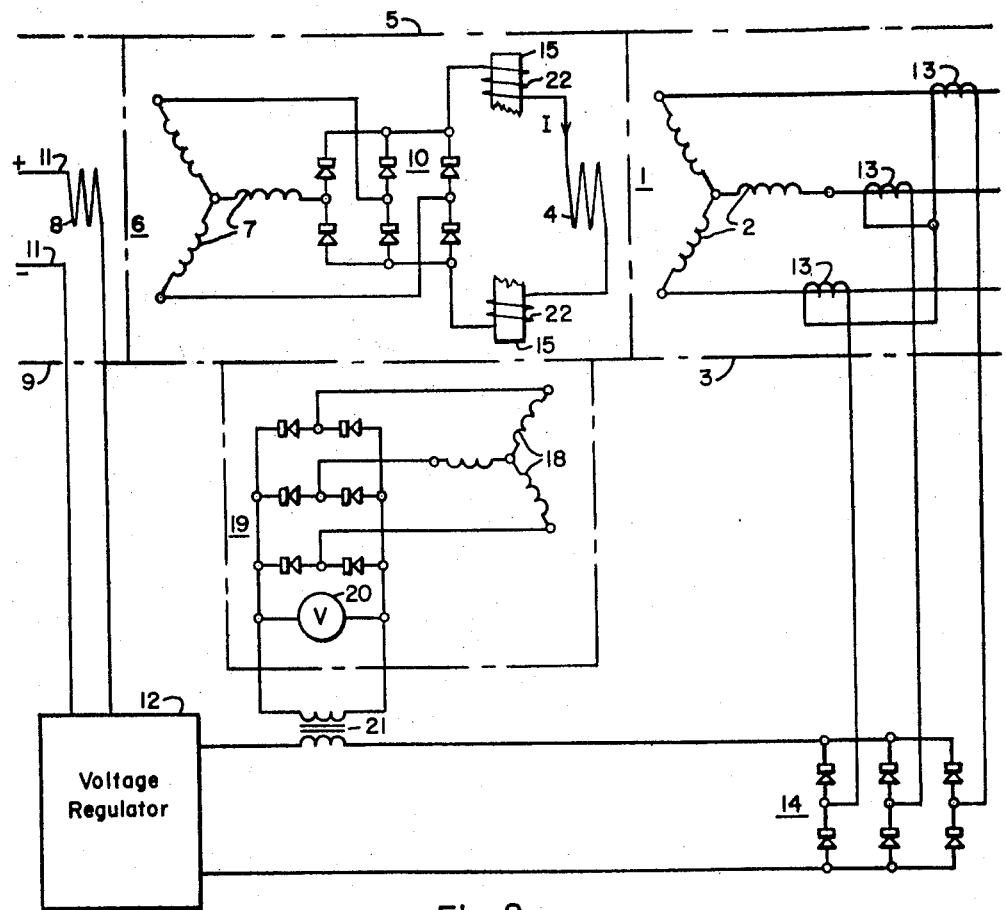

Other objects and advantages of the invention will be apparent from the following detailed description, taken in connection with the accompanying drawing, in which:

Figure 1 is a schematic diagram showing an illustrative embodiment of the invention in a brushless type dynamoelectric machine for obtaining a measurement of exciter output voltage; and Fig. 2 is a schematic diagram of another illustrative embodiment of the invention for obtaining a measurement of exciter output current.

The invention is shown in Fig. 1 as applied to the excitation system of a synchronous alternating current machine of the so-called brushless type, in which there are no sliding contacts and no slip rings or brushes. It will be apparent that the invention is generally applicable to any type of synchronous alternating current machine such as a generator, motor or condenser, either regulated or unregulated. The alternating current dynamoelectric machine shown in the drawing includes a synchronous alternating current machine 1, which may be of any suitable physical construction, and which includes, for the purpose of illustration, a three-phase alternating current armature winding 2 disposed on a stationary member 3. The synchronous machine 1 also has a field winding 4 which is mounted on the rotating member 5 and which is adapted to be supplied with direct current excitation.

The excitation for the synchronous machine 1 is supplied by an exciter 6 which is shown as an alternating current machine and which may be of any suitable construction. The exciter 6 has, for the purpose of illustration, a three-phase armature winding 7 which is carried on the rotating member 5 and has a field winding 8 on the stationary member 9. The exciter armature winding 7 is preferably mounted, as shown, on a common shaft or rotating member 5 with the direct current field 4 of the synchronous alternating current machine 1. The alternating current output of the exciter armature winding 7 is supplied to a rotating three-phase full-wave rectifier assembly 10, which is also mounted on the common rotating member 5, and the direct current output of the rectifier assembly 10 is connected to the field winding 4. In this way, an excitation system is provided for the synchronous alternating current machine 1 which requires no commutator or slip rings and no brushes. Of course, any suitable rectifier circuit or configuration can be used for the rectifier assembly 10.

The direct current field winding 8 of the exciter 6 is supplied with direct current in any desired manner and is shown as being separately excited from the direct current line 11. Any available source of direct current excitation may be used, or if desired, the field winding 8 might be excited from a pilot exciter of any suitable type driven from the shaft of the synchronous alternating current machine 1. Excitation of the exciter field 8 is controlled by a voltage regulator 12 which in turn is controlled by a signal from the output voltage of the synchronous alternating current machine 1 which signal is derived through current transformers 13 and rectifiers 14.

In a system of this type, as so far described, the conventional means for measuring the direct current excitation input to the field 4 of the synchronous alternating current machine 1 from the exciter armature winding 7 through rectifier assembly 10 obviously cannot be used. In accordance with the present invention, a simple and effective means is provided for measuring the exciter output voltage and current magnitudes and their time rate-of-change. For this purpose, an auxiliary field structure 15, which may take any suitable physical form, is provided on the rotating member 5. The auxiliary field structure 15 preferably has a plurality of magnetic poles carried on the rotating member for rotation therewith. Each pole is provided with a winding and the individual windings are suitably connected to each other to form an auxiliary field winding 16 which is connected across the output terminals of the rotating rectifier assembly 10. In such a manner, a winding 16 is provided on the field structure 15 and connected to be energized in response to the output voltage, $E_x$, of the rectifier assembly 10. The auxiliary field structure 15 might be overhung at either end of, or made integral with, the rotating member 5, or it might be provided as a separate device fitting over the shaft of the rotating member 5 with a collar-like fit. To limit the current in the auxiliary field winding 16 and to establish field winding time constants as needed, a suitable resistance, shown as resistor 17, may be used in series with the auxiliary field winding 16.

Opposite the rotating auxiliary field structure 15, a stationary auxiliary armature winding 18 is provided which may be supported in any suitable manner and is positioned to be magnetically interlinked and cooperative with the field of the rotating auxiliary field structure 15. The stationary auxiliary armature winding 18 is shown as a three-phase winding but it may have any suitable number of phases and may be either a distributed or a concentrated winding. An alternating current voltage is induced in the stationary auxiliary armature winding 18 by the rotating magnetic field of the field structure 15 and its magnitude can be made closely proportionate to the output voltage, $E_x$, of the rectifier assembly 10. A close approximation to the exciter voltage, $E_x$, can be obtained at all times throughout the exciter voltage range if the magnetic circuit is designed to avoid saturation or distortion within the range of the direct current excitation output voltage of the exciter.

The stationary auxiliary armature winding 18 could have its windings brought out to terminals to produce a system of polyphase voltages between terminals which could be measured as an indication of the direct current excitation voltage input, $E_x$, to the field 4 of the synchronous alternating current machine 1. As indicated in Fig. 1, however, it is preferred to connect a three-phase full-wave rectifier assembly 19 across the output of the auxiliary armature winding 18, thereby producing a direct current voltage, E, which is proportional to the exciter voltage, $E_x$, and which may be applied to a voltmeter 20 to indicate the exciter voltage, $E_x$, being furnished to the rotating field 4. Such a voltmeter 20 is shown connected across the output of the rectifier structure 19.

A damping transformer 21 whose primary is connected across the output voltage, E, of the rectifier assembly 19 will furnish a voltage signal, e, on the secondary side of the damping transformer 21 which will be proportional to the time rate-of-change of the exciter voltage, $E_x$. The secondary side of the damping transformer 21 may be connected into the voltage regulator circuit as shown to apply a stabilizing signal to the voltage regulator. The voltage signal, e, thus furnishes a feedback signal to the voltage regulator 12 thereby minimizing transient overshoot and stabilizing the output of the alternating current dynamoelectric machine 1.

It will be seen that under normal steady state conditions there will be no voltage, e, on the secondary side of the damping transformer 21 and therefore no operation of the voltage regulator 12 connected in series with the direct current field winding 8. During initial excitation of the synchronous alternating current machine field 4, however, or upon the occurrence of a sudden change in load, the sensing system will cause the voltage regulator 12 to note the time rate-of-change of the direct current excitation voltage, $E_x$, by means of the signal voltage, e, on the secondary side of the damping transformer 21 and a stabilizing or damping signal is thus provided to prevent excessive transient overshoot or oscillation of the generator voltage.

In some cases it may be desirable to obtain an indication of current, or of the time rate-of-change of current, in the excitation circuit. Fig. 2 shows a means for obtaining such an indication in an excitation system like that previously described. The generator, exciter and voltage regulating means may be the same as those shown in Fig. 1 and like elements are identified by the same reference numerals.

In Fig. 2, an auxiliary field winding 22, illustrated as wound from the leads of the rotating rectifier assembly 10 as they pass along the shaft of the rotating member 5 to the field 4, is placed on the auxiliary field structure 15 to create magnetic poles. It will be understood that the winding 22 may be any suitable winding connected in series with the rectifier output leads or connected to be energized proportionally to the output current. The auxiliary field winding 22 with the direct current input to the field 4 flowing through it, will produce a rotating magnetic field which will induce alternating current voltages in a properly placed stationary auxiliary armature winding 18, which may be similar to that used in Fig. 1. The magnitude of the voltage induced in the auxiliary armature winding 18 will be proportional to the current flow through the rotating auxiliary field winding 22 and can be read directly by an alternating current instrument or preferably as shown, can be rectified by a rectifier assembly 19 with the resultant output read by a direct current voltmeter 20. The output of the rectifier assembly 19 is connected across the primary side of a damping transformer 21 as described in connection with Fig. 1. The secondary side of the damping transformer 21 then furnishes a voltage to the voltage regulator 12 proportional to the time rate-of-change of the current to the field winding 4 of the synchronous alternating current machine 1.

It should now be apparent that simple and inexpensive means have been provided for measuring the magnitude of direct current voltage or current being supplied by a rotating rectifier to the direct current field of a synchronous alternating current machine of the brushless type. Further, a system has been provided for obtaining a measurement of the time rate-of-change of the direct current excitation voltage or current to the direct current field 4. It will be obvious that both current and voltage measurements can be used together if desired. As illustrated, this measure of time rate-of-change of the direct current excitation can be fed back to a voltage regulator thereby stabilizing the alternating current dynamoelectric machine. If desired, the same measure of rate-of-change of the direct current excitation can be fed into a separate winding in a magnetic amplifier type of voltage regulator or can be used in any desired manner.

Although specific embodiments of the present invention have been shown and described, it is to be understood that still further modifications thereof can be made without departing from the spirit and scope of the invention and are herein intended.

I claim as my invention:

1. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output of said rectifier assembly, a stationary auxiliary armature winding positioned to cooperate with said auxiliary field winding, and means for measuring the voltage induced in the auxiliary armature winding.

2. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected across the direct current output voltage of said rectifier assembly, a stationary auxiliary armature winding positioned to cooperate with said auxiliary field winding, and means for measuring the voltage induced in the auxiliary armature winding.

3. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output current of said rectifier assembly, a stationary auxiliary armature winding positioned to cooperate with said auxiliary field winding, and means for measuring the voltage induced in the auxiliary armature winding.

4. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field structure mounted for rotation with said rotatable member and including a plurality of pole members, an auxiliary field winding disposed on said pole members and electrically connected across the direct current output of the rectifier assembly, a stationary auxiliary armature winding positioned to cooperate with said auxiliary field winding, and means for measuring the voltage induced in the auxiliary armature winding.

5. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field structure mounted for rotation with said rotatable member and including a plurality of pole members, an auxiliary field winding disposed on said pole members and connected to be energized by the output current of the rectifier assembly, a stationary auxiliary armature winding positioned to cooperate with said auxiliary field winding, and means for measuring the voltage induced in the auxiliary armature winding.

6. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output of said rectifier assembly, a stationary auxiliary armature winding positioned to cooperate with said auxiliary field winding, and means for sensing the rate of change of the voltage induced in the auxiliary armature winding.

7. In combination, a synchronous alternating current dynamoelectric machine having a stationary armature member and a rotatable member carrying a direct current field winding, an exciter for said machine having a stationary field member and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output of said rectifier assembly, a stationary auxiliary armature winding positioned to cooperate with said auxiliary field winding, rectifying means for rectifying the voltage induced in the auxiliary armature winding, and transformer means providing a signal proportional to the rate of change of the rectified voltage.

8. In combination, a synchronous alternating current dynamoelectric machine having a stationary armature member and a rotatable member carrying a direct current field winding, an exciter for said machine having a stationary field winding and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output of said rectifier assembly, a stationary auxiliary armature winding positioned to cooperate with said auxiliary field winding, voltage regulator means connected to control the exciter field winding, and means for deriving a signal from the auxiliary armature winding proportional to the rate of change of the output of the rectifier assembly and for applying said signal to the voltage regulator means.

9. In combination, a synchronous alternating current dynamoelectric machine having a stationary armature member and a rotatable member carrying a direct current field winding, an exciter for said machine having a stationary field winding and an alternating current armature member rotatable with said rotatable member, a rectifier assembly mounted for rotation with said rotatable member and electrically connected between the exciter armature member and said direct current field winding to supply direct current excitation thereto, an auxiliary field winding mounted for rotation with said rotatable member and connected to be energized by the output of said rectifier assembly, a stationary auxiliary armature winding position to cooperate with said auxiliary field winding, rectifying means for rectifying the voltage induced in the auxiliary armature winding, a damping transformer connected to have an output signal proportional to the rate of change of the rectified voltage, a voltage regulator connected to control the exciter field winding, and means for applying the output signal from said transformer to stabilize the operation of the voltage regulator.

References Cited in the file of this patent

UNITED STATES PATENTS

| | | |
|---|---|---|
| 1,100,895 | Liljenroth | June 23, 1914 |
| 2,804,589 | Penn | Aug. 27, 1957 |

FOREIGN PATENTS

| | | |
|---|---|---|
| 22,880 | Netherlands | Oct. 15, 1930 |
| 518,891 | Great Britain | Mar. 11, 1940 |